United States Patent [19]
Denz et al.

[11] Patent Number: 5,537,322
[45] Date of Patent: Jul. 16, 1996

[54] SYSTEM AND METHOD FOR DETERMINING A GRADIENT SPEED OF A SHAFT DRIVEN BY AN INTERNAL COMBUSTION ENGINE

[75] Inventors: Helmut Denz, Stuttgart; Ernst Wild; Klaus Boettcher, both of Oberriexingen; Georg Mallebrein, Stuttgart; Christian Tischer, Hemmingen, all of Germany

[73] Assignee: Robert Bosch GmbH, Stuttgart, Germany

[21] Appl. No.: 256,313

[22] PCT Filed: Oct. 29, 1993

[86] PCT No.: PCT/DE93/01038

§ 371 Date: Sep. 6, 1994

§ 102(e) Date: Sep. 6, 1994

[87] PCT Pub. No.: WO94/10577

PCT Pub. Date: May 11, 1994

[30] Foreign Application Priority Data

Nov. 4, 1992 [DE] Germany ............... 42 37 194.5

[51] Int. Cl.[6] ............................ G06G 7/76; G01P 3/42
[52] U.S. Cl. .............. 364/431.07; 364/565; 364/566; 364/569; 73/116; 73/117.3; 324/176; 324/178; 324/169; 341/11; 341/6
[58] Field of Search .................. 364/431.07, 431.01, 364/565, 566, 511, 431.03, 569, 571.07, 559, 571.01, 556, 426.04, 424.1, 426.02; 324/169, 173, 392, 166, 160, 176, 178; 123/419, 414, 609, 417, 339, 585; 341/6, 11, 13, 1, 7, 9, 10; 73/116, 117.3

[56] References Cited

U.S. PATENT DOCUMENTS

| | | | |
|---|---|---|---|
| Re. 34,183 | 2/1993 | Wilens et al. | 123/414 |
| 4,356,447 | 10/1982 | Hönig et al. | 364/565 |
| 4,485,452 | 11/1984 | Cording et al. | 364/565 |
| 4,532,798 | 8/1985 | Kohama et al. | 364/511 |
| 4,715,009 | 12/1987 | Bohmler et al. | 364/565 |
| 4,745,554 | 5/1988 | Tomazawa et al. | 364/431.07 |
| 4,972,332 | 11/1990 | Luebbering et al. | 364/565 |
| 4,977,525 | 12/1990 | Blackwell | 364/565 |
| 5,264,844 | 11/1993 | Itou et al. | 341/11 |
| 5,265,037 | 11/1993 | Izumi et al. | 364/565 |
| 5,327,360 | 7/1994 | Poisson | 364/565 |

FOREIGN PATENT DOCUMENTS 3421640  1/1985  Germany.

*Primary Examiner*—Kevin J. Teska
*Assistant Examiner*—Jacques H. Louis-Jacques
*Attorney, Agent, or Firm*—Michael J. Striker

[57] ABSTRACT

In a system and a method for determining the speed gradient dn/dt of a shaft of an internal combustion engine, the speed gradient dn/dt is determined as a function of the third power of the speed and the difference between two segment times in the control device. The speed gradient is only determined in phases which are not time-critical, while segment times are read in or stored only in time-critical phases so that the data required for controlling and regulating the internal combustion engine can be calculated in these time-critical phases independently from the determination of the speed gradient.

12 Claims, 2 Drawing Sheets

5,537,322

SYSTEM AND METHOD FOR DETERMINING A GRADIENT SPEED OF A SHAFT DRIVEN BY AN INTERNAL COMBUSTION ENGINE

PRIOR ART

The invention proceeds from a device according to the generic part of the main claim.

Devices for determining the speed gradient dn/dt or ngrad of an internal combustion engine are already known. For example, it is known from DE-PS 34 21 640 to calculate the speeds of the engine from the intervals between pairs of speed-dependent pulses and to determine a value for the change in speed, i.e. a speed gradient, from at least two speeds calculated in this manner.

However, the known device has the disadvantage that the calculation of the speed gradient in the control device and the calculations required for controlling or regulating the internal combustion engine are carried out at the same time so that the computing device of the control device is highly loaded, especially during particularly time-critical phases.

ADVANTAGES OF THE INVENTION

The device according to the invention for determining the speed gradient dn/dt with the characterizing features of the main claim has the advantage over the device known from the prior art that loading of the computer is reduced in that the data required for controlling and regulating the internal combustion engine are calculated in a time-critical phase and the speed gradients dn/dt or ngrad are determined in a phase which is not time-critical.

This separate calculation, which is possible because the speed gradient need not be calculated as often as other parameters, is advantageously improved in that the calculation of the speed gradient dn/dt is effected in a particularly simple manner and the speed n, which is calculated in any case, and the segment times $t_{seg}(i)$ and $t_{seg}(i-1)$, which are also determined in any case, are used for the calculation.

Further advantages of the invention follow from the features of the subclaims.

DRAWING

DESCRIPTION OF THE EMBODIMENT EXAMPLE

Figure 1:
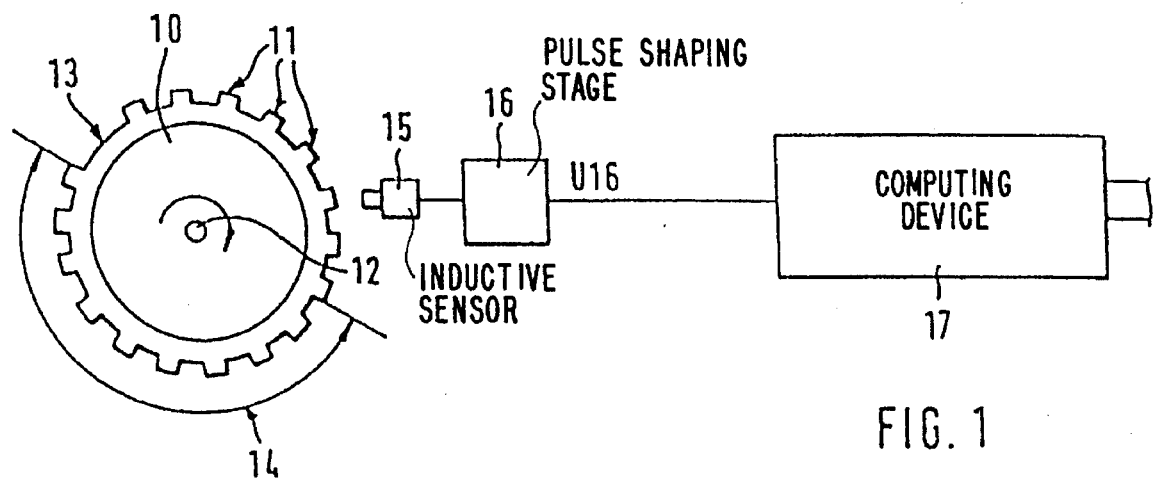
FIG. 1 is a view showing a known device used in motor vehicles for detecting speed and for controlling an internal combustion engine and which can also be used to realize the present invention.

A device suitable for carrying out the process according to the invention is shown in FIG. 1. An increment disk 10 having a plurality of identical angle marks 11, e.g. 60-2, at its surface is attached to a shaft 12 whose speed and change in speed are to be determined. This shaft is the crankshaft of an internal combustion engine in the selected embodiment example.

All of the angle marks 11 of the increment disk 10 are arranged at an identical distance from one another. A reference mark which is formed in the embodiment example shown in the drawing as an absent mark and is also known as a synchronous gap is designated by 13.

With a suitably adapted increment disk, the speed gradient for another shaft, e.g. the camshaft, could also be determined. The increment disk could also be replaced by another disk with at least one angle mark.

Further, a segment disk with one angle mark per cylinder can be used for determining the speed gradient of the camshaft or in a corresponding manner with one angle mark per number of cylinders/2 in the crankshaft.

As concerns the increment disk already mentioned, which is connected with the crankshaft of an internal combustion engine, two segments 14 are required, as is well known, for producing suitable trigger marks in a four-cylinder internal combustion engine. Accordingly, in a disk with 60-2 angle marks, a segment would extend over 30 marks.

In a six-cylinder internal combustion engine, three segments would be required; in a disk with 60-2 marks, a segment would accordingly extend over 20 marks.

The increment disk 10 which rotates, for example, in the direction of the arrow is sensed by a transmitter formed as a pickup 15, e.g. an inductive sensor. The pickup supplies speed-dependent output signals which are shaped in the pulse-shaping stage 16 to produce square-wave pulses. These square-wave pulses are in turn evaluated in the computing device 17, e.g. the control device, to determine values required for controlling and/or regulating the internal combustion engine. In so doing, time periods are formed from determined pulse intervals and the sides or flanks of determined angle marks serve as trigger marks.

Further, the speed n and the speed gradient dn/dt or grad n are determined from these square-wave pulses or from the time periods obtained therefrom.

Figure 2:
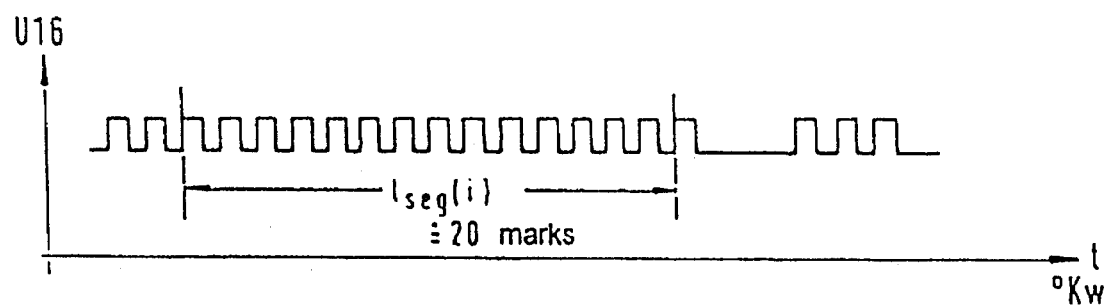
FIG. 2 is a view showing a signal curve produced by the device in accordance with the present invention.

The square-wave signal U16 to be evaluated is plotted over time t in FIG. 2. The segment time essential for determining the mean speed n and for calculating the speed gradient dn/dt is designated in FIG. 2 by $t_{seg}(i)$. The preceding segment time would be $t_{seg}(i-1)$. The segment time is the elapsed time during which a segment passes by the pickup.

Time-critical calculations and the calculation of the speed gradient dn/dt which is carried out only during phases which are not time-critical are performed in the computing device 16. A suitable formula for calculating the speed gradient is determined on the basis of the following considerations: Both the segment time $t_{seg}$ and the speed n must be used for calculating the speed gradient, so that $$ngrad = dn/dt = \frac{\frac{K}{t_{seg}(i)} - \frac{K}{t_{seg}(i-1)}}{t_{seg}(i)} \quad (1)$$

$$ngrad = dn/dt = K\left[\frac{1}{t_{seg}(i)^2} - \frac{1}{t_{seg}(1)*t_{seg}(i-1)}\right] \quad (2)$$

$$ngrad = dn/dt = K\frac{t_{seg}(i-1) - t_{seg}(i)}{t_{seg}(i)^2 * t_{seg}(i)} \quad (3)$$

In the denominator of this equation, the segment time $t_{seg}(i-1)$ can be equated with $t_{seg}(i)$ by approximation and the two segment times can accordingly be replaced with the value K/n:

$$t_{seg}(i-1) = t_{seg}(i) = K/n \quad (4)$$

The calculation formula may be simplified to:

$$ngrad=dn/dt=n^3/K^2+[t_{seg}(f-1)-t_{seg}(i)] \qquad (5)$$

Ultimately, the equation given for the calculation of the speed gradient dn/dt is dependent on the third power of the speed, divided by the square of the constant K, and multiplied by the difference of two segment times.

Expenditure on computing means can be reduced by carrying out the process indicated in FIG. 3. In so doing, in the time-critical computing grid in the segment cycle, tile old segment time is stored temporarily and the new segment time is then calculated. Accordingly, there is always a valid pair of values for the segment times $t_{seg}(i)$ and $t_{seg}(i-1)$ from which the speed gradient dn/dt is calculated in a grid which is not time-critical.

Figure 3A:
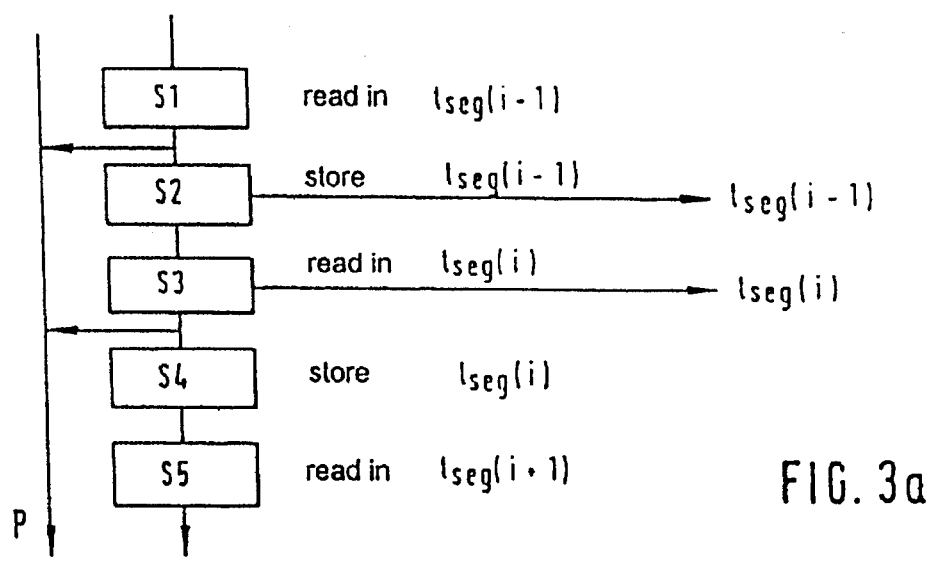
FIG. 3a is a flow chart illustrating a sequence of individual steps carried out in a time-critical computing grid in a segment cycle.

The sequence of individual steps carried out in the time-critical computing grid in the segment cycle is shown in FIG. 3a:

S1: read in segment time $t_{seg}(i-1)$

S2: store segment time $t_{seg}(i-1)$

S3: read in segment time $t_{seg}(i)$

S4: store segment time $t_{seg}(i)$

S5: read in segment time $t_{seg}(i+1)$

These steps repeat continuously at the appropriate times.

The evaluation for determining tile data required for controlling and regulating the internal combustion engine is effected in tile same time grid in which the different segment times are read in or stored. These data are calculated by running program P.

Two segment times—segment times $t_{seg}(i-1)$ and $t_{seg}(i)$ in the example used in FIG. 3—are provided for the calculations in the region which is not time-critical. The speed gradient in the program which is not time-critical is determined from two segment times and a stored constant K in tile following steps.

In step S10, the speed n is determined from a stored constant K and the read in segment time $t_{seg}(i)$ in that the constant K is divided by the segment time $t_{seg}(i)$.

In step S11, the square of the speed $n^2$ is formed from the speed n. In step S12, the third power $n^3$ of the speed is calculated from the speed n and from the square of the speed.

In step S13, the third power of the speed $n^3$ is divided by $K^2$, where $K^2$ was either storable or was calculated from K.

In step S14, the read in segment time $t_{seg}(i)$ is substracted from the stored segment time $t_{seg}(i-1)$. This difference is multiplied in step S15 by $n^3/K^2$ so that the desired speed gradient dn/dt results in step S15.

Figure 3B:
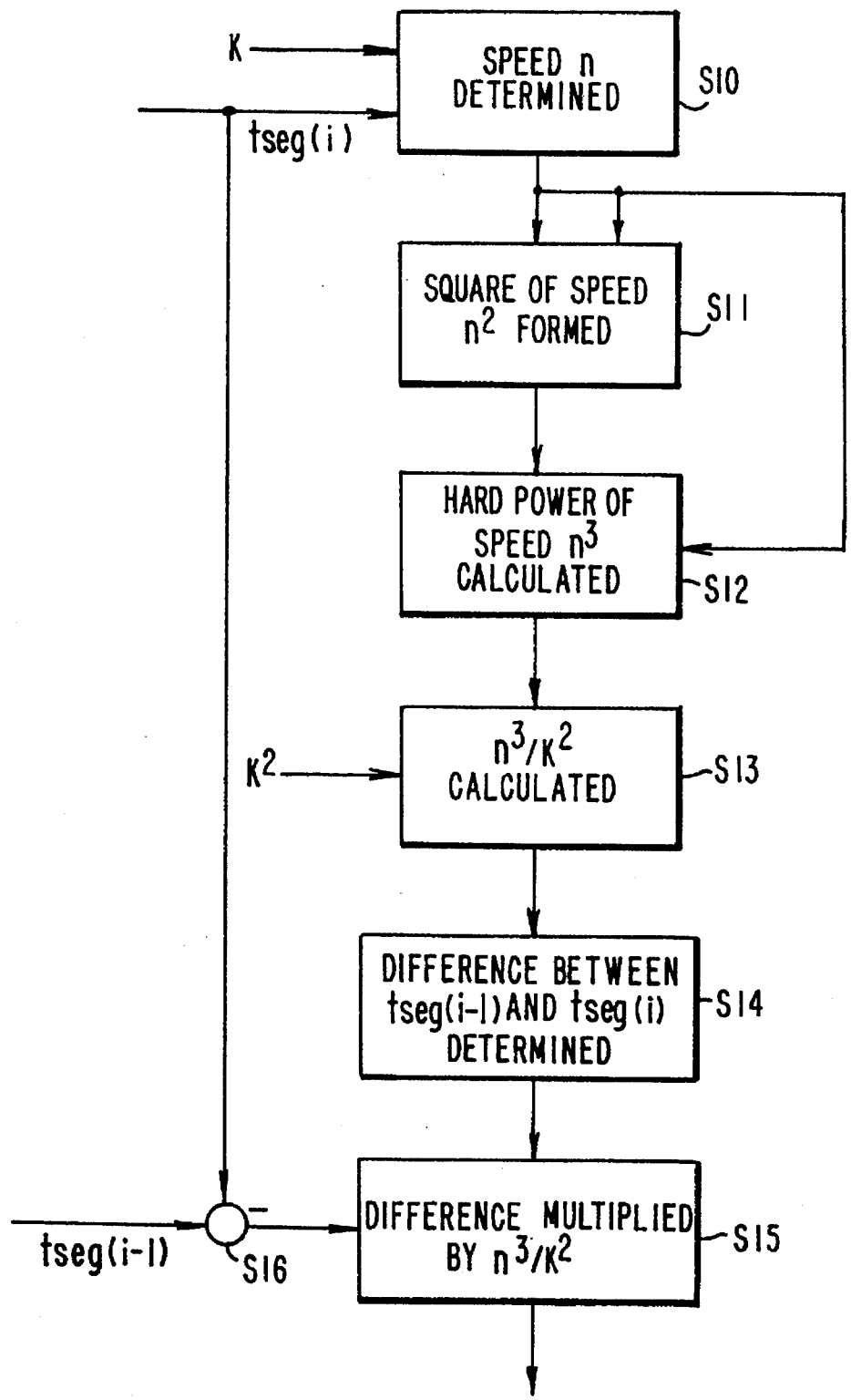
FIG. 3b is a flow chart illustrating the determination of a speed gradient dn/dt or ngrad in accordance with a program which is run in not time-critical phases.

The program described in FIG. 3b can also run in different sequences. It is essential that this program is run only in phases which are not time-critical so that the computing device 17 is not loaded in the time-critical phases.

We claim:

1. A device for determining a speed gradient of a shaft driven by an internal combustion engine, comprising a transmitter for generating a speed-dependent pulse train associated with the shaft; and a computing device determining time intervals between at least one of selectable pulses and identical pulse edges, said computing devices being formed so as to continuously determine parameters for regulating an internal combustion engine in a time-critical program as a function of these times, said transmitter and said computing device being formed so that a speed gradient is calculated in phases when no calculations for controlling or regulating the internal combustion engine are carried out so that said phases are not time-critical.

2. A device as defined in claim 1, wherein said transmitter and said computing device are formed so that a segment is a time during which a crankshaft of the internal combustion engine rotates by an angle 360°/z2 wherein z is a number of cylinders in the internal combustion engine.

3. A device as defined in claim 1, wherein said computing device is a control device of the internal combustion engine.

4. A device as defined in claim 1, wherein said computing device is formed so that the speed gradient is formed as a function of a third power of a speed and a preceding time segment is subtracted from a current segment time.

5. A device as defined in claim 1, wherein said computing device has a non-volatile storage in which at least one constant is stored.

6. A device as defined in claim 1, wherein said computing device has means for calculating the speed gradient according to the following formula:

$$ngrad=dt/dn=n^3/K^{2*}\ [t_{seg}(i-1)-t_{seg}(i)].$$

7. A method of determining a speed gradient of a shaft driven by an internal combustion engine, comprising the steps of generating a speed-dependent pulse train associated with the shaft by a transmitter; determining by a computing device time intervals between selectable pulses or between identical pulse edges; continuously determining by the computing device parameters for regulating the internal combustion engine in a time critical program as a function of these times; and determining a speed gradient in phases which are not time critical.

8. A method as defined in claim 7, wherein said determining time intervals include determining time intervals as segment times, where a segment time is a time during which a crankshaft of the internal combustion engine rotates by an angle of 360°/z2 wherein z is the number of the cylinders in the internal combustion engine.

9. A method as defined in claim 7, wherein said determining by the computing device includes determining by such a computing device which is a control device of the internal combustion engine.

10. A method as defined in claim 7, wherein said determining the speed gradient includes forming the speed gradient as a function of a third power of a speed, and subtracting a preceding time segment from a current segment time.

11. A method as defined in claim 7; and further comprising the step of storing at least one constant in a non-volatile storage of the computing device.

12. A method as defined in claim 7, wherein said determining the speed gradient includes calculating the speed gradient in the computing device according to the following formula:

$$ngrad=dt/dn=n^3/K^{2*}\ [t_{seg}(i-1)-t_{seg}(i)].$$

\* \* \* \* \*